US006796725B2

(12) United States Patent
Velsher et al.

(10) Patent No.: US 6,796,725 B2
(45) Date of Patent: Sep. 28, 2004

(54) OPTO-ELECTRONIC PACKAGE FOR INTEGRATED SEALING OF OPTICAL FIBERS

(75) Inventors: Benne Velsher, San Diego, CA (US); John F. Boehm, Chicago, IL (US)

(73) Assignee: Kyocera America, Inc., San Diego, CA (US)

( * ) Notice: Subject to any disclaimer, the term of this patent is extended or adjusted under 35 U.S.C. 154(b) by 0 days.

(21) Appl. No.: 09/972,282

(22) Filed: Oct. 5, 2001

(65) Prior Publication Data

US 2003/0068141 A1 Apr. 10, 2003

(51) Int. Cl.$^7$ ................................................ G02B 6/42
(52) U.S. Cl. ........................................................ 385/92
(58) Field of Search .................................... 385/88–94

(56) References Cited

U.S. PATENT DOCUMENTS

| | | | | |
|---|---|---|---|---|
| 5,011,256 | A | * | 4/1991 | Johnson et al. ................ 385/92 |
| 5,454,055 | A | * | 9/1995 | Kragl et al. ................... 385/14 |
| 5,664,043 | A | | 9/1997 | Donaldson et al. .......... 385/138 |
| 5,671,315 | A | | 9/1997 | Tabuchi et al. ............. 385/137 |
| 6,216,939 | B1 | | 4/2001 | Thackara .................. 228/124.6 |
| 6,250,819 | B1 | * | 6/2001 | Porte et al. .................... 385/88 |
| 6,530,701 | B2 | * | 3/2003 | Jin ............................... 385/94 |

FOREIGN PATENT DOCUMENTS

| | | |
|---|---|---|
| EP | 0-636 909 | 2/1995 |
| WO | WO-00/21130 | 4/2000 |

OTHER PUBLICATIONS

International Search Report dated May 19, 2003 from: European Patent Office.

* cited by examiner

Primary Examiner—Akm Enayet Ullah
Assistant Examiner—Jerry T Rahll
(74) Attorney, Agent, or Firm—Hogan & Hartson LLP

(57) ABSTRACT

An opto-electronic package includes an enclosed package, a plurality of the electrical contacts extending into the enclosed package, an optical integrated circuit mounted within the package and coupled to the electrical contacts, and optical fibers extending through opposite ends of the package to the optical integrated circuit along a common plane. The package is comprised of a package body and an opposite package lid joined together by solder sealing at an interface substantially at the common plane, and configured to form end pipes around the optical fibers and solder sealed therewith at the opposite ends of the package, to form a hermetically sealed package. This enables the optical fibers to be laid into feedthroughs formed by opposing portions of the package body and the package lid before they are joined together.

8 Claims, 4 Drawing Sheets

OPTO-ELECTRONIC PACKAGE FOR INTEGRATED SEALING OF OPTICAL FIBERS

BACKGROUND OF THE INVENTION

1. Field of the Invention

The present invention relates to opto-electronic packages in which optical fibers are sealed, and more particularly to packages in which an optical integrated circuit controls optical fibers coupled thereto in conjunction with electrical leads coupled to the package.

2. History of the Prior Art

Opto-electronic devices are known in which the optical fibers are coupled for control in conjunction with electrical leads coupled to an optical integrated circuit (IOC). Examples of such devices include optical switches, lasers, detectors, amplifiers, and modulators. The optical integrated circuit switches the optical fiber inputs and outputs in response to signals provided on the electrical leads.

Opto-electronic devices of the type described are typically made by attaching an optical integrated circuit to a package body, wire bonding the optical integrated circuit to the body for coupling to leads attached to the body, optically aligning and attaching optical fibers to the optical integrated circuit, sealing the optical fibers to the package body, sealing a lid over the package body to provide an enclosed package, and anchoring the optical fibers at the opposite ends of the package. Many applications of the opto-electronic devices require hermetic sealing of the package body. Hermeticity requires that the enclosure be sealed, including the fiber interfaces therewith, with no organic material within the boundaries of the enclosure.

One conventional construction of an opto-electronic package for integrated sealing of optical fibers utilizes a separate submount assembly in conjunction with the package body. The submount, which defines a separate substrate for the package, has an optical integrated circuit mounted thereon together with fiber arrays at opposite sides of the optical integrated circuit. The optical integrated circuit is wire bonded to electrical connections on the submount, and the opposite fiber arrays are aligned and attached to the submount. The submount assembly is then placed within a package body in such a way that the opposite fiber arrays are threaded through end pipes at opposite ends of the package body. When the fiber arrays are positioned within the end pipes, the submount assembly is positioned in a central location within the package body, where it is secured to the body. The submount assembly is then wire bonded to electrical leads which extend into the interior of the package body from opposite sides thereof. The optical fiber arrays are then sealed within the end pipes. A lid for the package is placed over the open package body, and is sealed thereon such as by seam welding. The fiber arrays are then sealed at the fiber pipes, such as with cured epoxy, to complete the opto-electronic package.

Opto-electronic packages of the type described in the preceding paragraph suffer from a number of disadvantages. For one thing, the package must be large enough to thread the fiber arrays through the opposite end pipes without overstressing the fibers. Moreover, even with relatively large packages, the fibers must be bent when attaching the submount assembly. Even when the amount of fiber bending is minimized, fiber damage can occur with the result that signal insertion loss is increased and long term reliability problems sometimes arise. The opposite fiber arrays are jacketed at the outside of bare portions of the fibers. Because the jacketed portions of the fibers are substantially larger than the bare portions, apertures in the end pipes must be large enough for the jacketed portions to be threaded therethrough, even though the smaller bare portions of the fibers are sealed within the end pipes. The bare portions of the fibers are metallized, and sealing is accomplished by dispensing molten solder through vertical apertures in the end pipes. Because the apertures in the end pipes must be large enough to accommodate the jacketed portions of the fibers, they are relatively large, thereby requiring a large amount of solder to fill the apertures and accomplish sealing of the fibers thereto. Automated assembly of the opto-electronic package further requires the use of the separate submount assembly.

In an effort to eliminate some of the disadvantages of such conventional opto-electronic packages, alternative arrangements are sometimes used. In one such alternative arrangement, input/output fiber arrays are inserted into the package first, followed by optical alignment and attachment in the package. However, fiber array insertion is difficult to automate in such arrangement. While this approach does not require an increase in package size, the optical alignment process cannot be easily automated because the higher package walls get in the way of machine tooling. In a further alternative approach, the fibers are sealed in the fiber pipe before attaching this assembly to the package. However, the fiber pipe-to-package joint must be performed at a sufficiently low temperature to prevent the re-flow of the completed fiber seal. This leads to potential reliability problems, when the product is close to the end of the assembly cycle.

BRIEF SUMMARY OF THE INVENTION

Briefly stated, the present invention provides an opto-electronic package for integrated sealing of optical fibers having an enclosed package which is split at or close to the plane of the fiber axes. This enables the fibers to be laid in the package body with the opposing lid then being placed over the body to form the enclosed package. Threading of the fibers through the opposite end pipes is eliminated, with the result that the package can be made much smaller. Also, because the optical fibers are laid in rather than threaded, the opposite end pipes formed by mating portions of the package body and a lid need only have apertures therein which are very slightly larger than the fibers themselves, eliminating the large apertures which must be solder sealed in prior arrangements. It is not necessary to thread the jacketed portions of the optical fibers through the end pipes.

In opto-electronic packages according to the invention, automated techniques for fiber alignment and attachment can be accomplished without the need for an intermediate subassembly. The optical integrated circuit is mounted directly on the package base assembly and is wire bonded thereto to complete the required electrical interconnections. The package base may be built as a multi-layer ceramic substrate to provide the required electrical connectivity. Alternatively, the package may have a metal base. In either case, a metal seal ring is used for fiber sealing. The package lid is designed to have the necessary mating features such as to provide the fiber feedthrough for optical fiber sealing and fiber jacket strain relief. The optical fibers can be fully terminated at both ends prior to the final assembly and package sealing operations. The package lid may be sealed to the package body such as by using solder sealing. The optical fibers can be sealed to the assembled package such as by solder sealing metal coated fibers, solder sealing bare fibers, or low temperature glass sealing. The package lid can be sealed in place prior to the sealing of the optical fibers at the opposite ends of the package. However, because both sealing operations typically involve solder sealing, they can be accomplished simultaneously, thereby improving over prior art arrangements in which separate lid and fiber sealing are required.

BRIEF DESCRIPTION OF THE DRAWINGS

The above and other objects, features and advantages of the invention will be apparent from the following description when taken in conjunction with the accompanying drawings, in which.

DETAILED DESCRIPTION OF THE INVENTION

Figure 1:
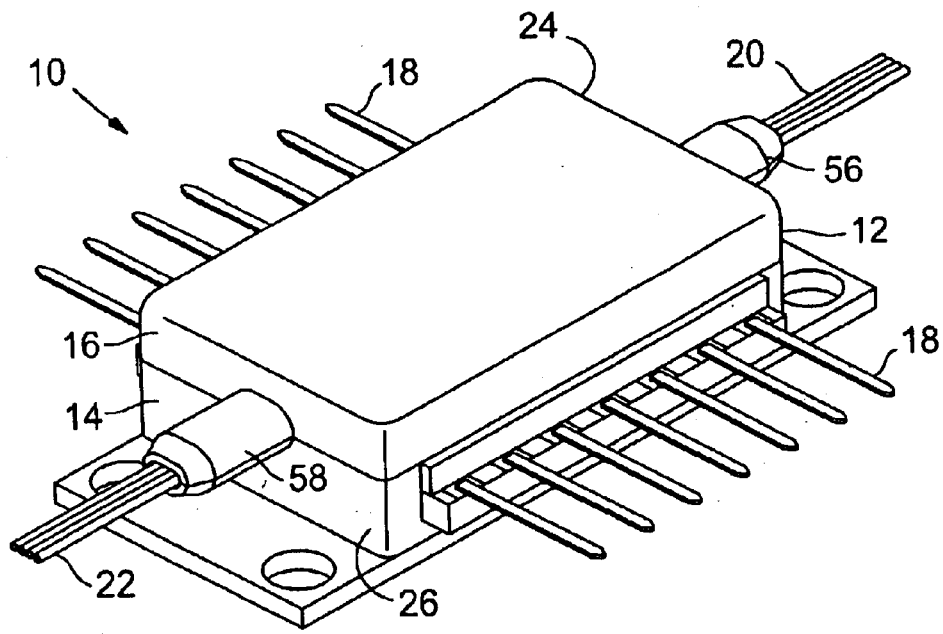
FIG. 1 is a perspective view of an opto-electronic package for integrated sealing of optical fibers in accordance with the invention.

FIG. 1 shows an opto-electronic package 10 for integrated sealing of optical fibers, in accordance with the invention. The opto-electronic package 10 has an enclosed package 12 comprised of a package body 14 and an opposing, mating package lid 16. Electrical leads 18 extend into the enclosed package 12 from opposite sides of the package body 14. Also, opposite arrays 20 and 22 of optical fibers extend into the enclosed package 12 from opposite ends 24 and 26 thereof, respectively.

The opto-electronic package 10 in accordance with the invention is shown and described in FIG. 1 and in the other figures of drawing in terms of the opposite arrays 20 and 22 of optical fibers with each of the arrays 20 and 22 being comprised of a plurality of individual fibers. However, those skilled in the art will appreciate from the description to follow that the principles of the invention apply to arrangements having only a single array of fibers at one end of the package as well as those having a single optical fiber at one or both ends of the package.

Figure 2:
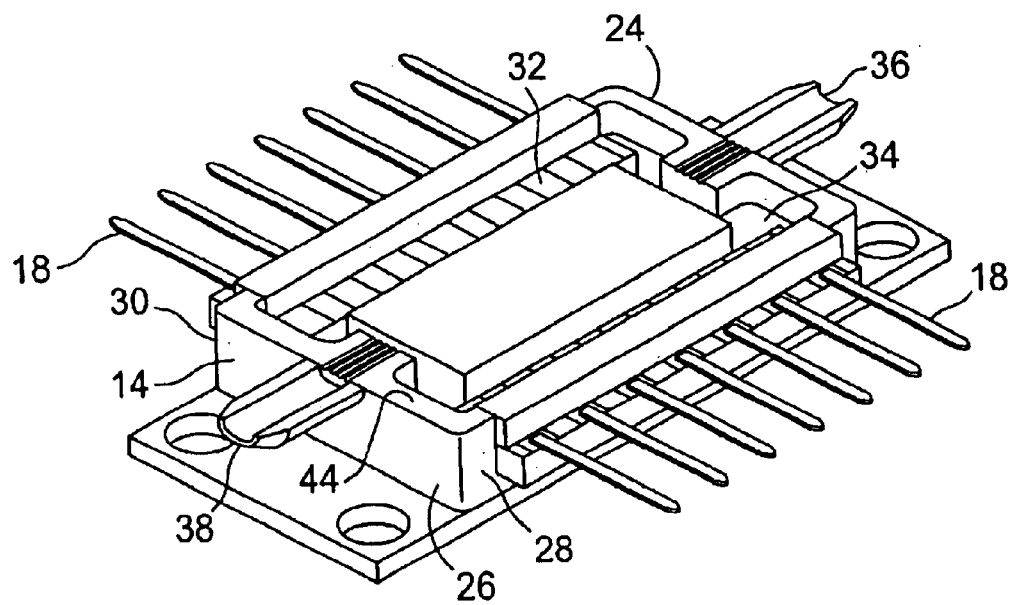
FIG. 2 is a perspective view of a package body of the package of FIG. 1.

FIG. 2 shows the details of the package body 14. As shown therein, the electrical leads 18 extend into the package body 14 from opposite sides 28 and 30 thereof. The electrical leads 18 are electrically coupled to wire bond pads 32 within a hollow interior 34 of the package body 14. Opposite fiber feedthroughs 36 and 38 extend from the opposite ends 24 and 26, respectively, and are of hollowed-out configuration.

Figure 3:
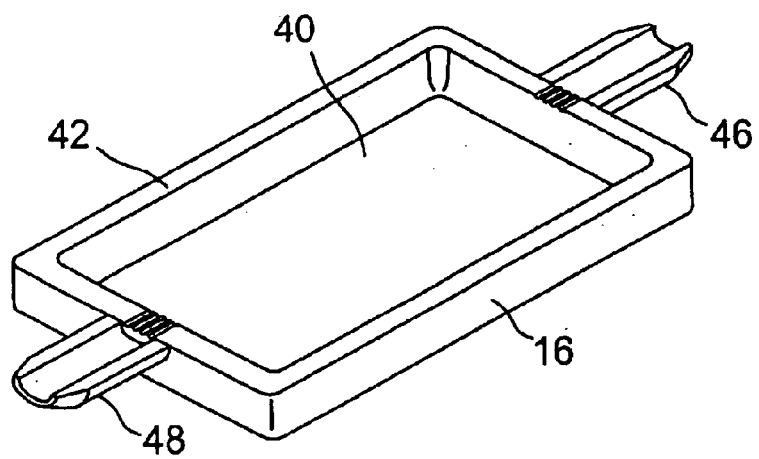
FIG. 3 is a perspective view of a package lid of the package of FIG. 1, inverted to show the details of the underside thereof.

FIG. 3 shows the package lid 16, which is inverted to show the details of the underside thereof. The package lid 16 has a hollow interior 40 which combines with the hollow interior 34 of the package body 14 to define a hollow interior within the enclosed package 12. An edge portion 42 extending around the hollow interior 40 of the package lid 16 forms an interface with a mating edge portion 44 of the package body 14 when the package lid 16 is mounted over the package body 14, as shown in FIG. 1. With the package lid 16 mounted on the package body 14, opposite fiber feedthroughs 46 and 48 are disposed over the fiber feedthroughs 36 and 38, respectively, of the package body 14.

Figure 4:
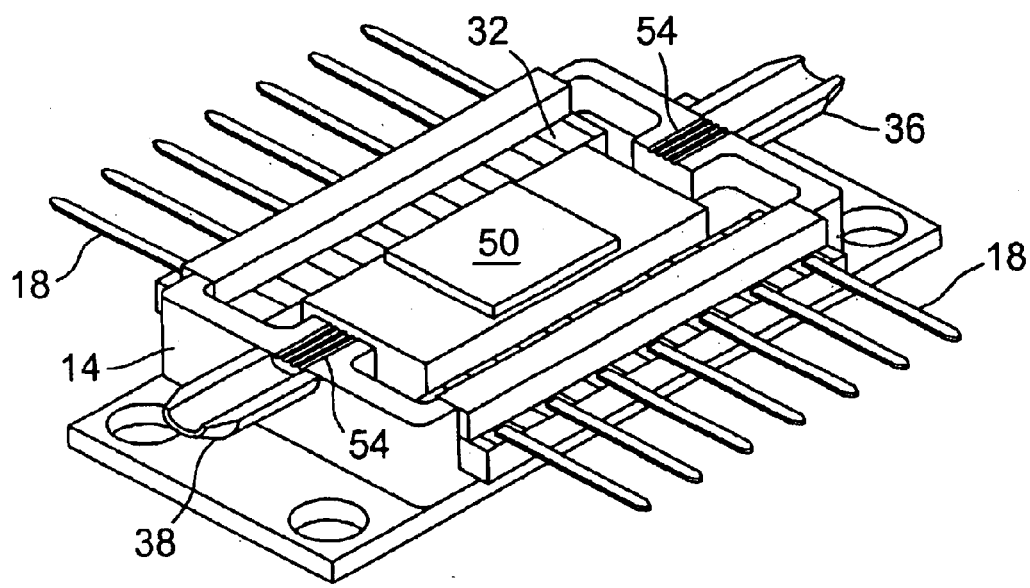
FIG. 4 is a perspective view of the package body of FIG. 2 with an optical integrated circuit mounted in place thereon.

FIG. 4 shows the package body 14 with an optical integrated circuit 50 mounted thereon. The optical integrated circuit 50 has conductive pads thereon (not shown) which are wire bonded to the wire bond pad 32 of the package body 14 to provide desired electrical interconnection of the optical integrated circuit 50 with the electric leads 18.

Figure 5:
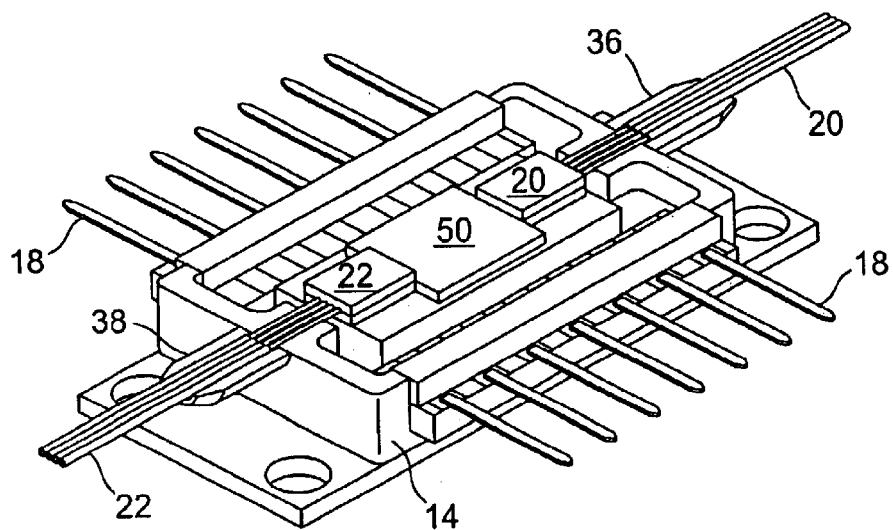
FIG. 5 is a perspective view of the structure of FIG. 4 with optical fibers aligned and attached thereto.

FIG. 5 shows the structure of FIG. 4 with the opposite optical fiber arrays 20 and 22 aligned and attached thereto. The fiber arrays 20 and 22 are coupled to opposite sides of the optical integrated circuit 50. Individual optical fibers of the arrays 20 and 22 extend along the opposite fiber feedthroughs 36 and 38 of the package body 14.

Figure 6:
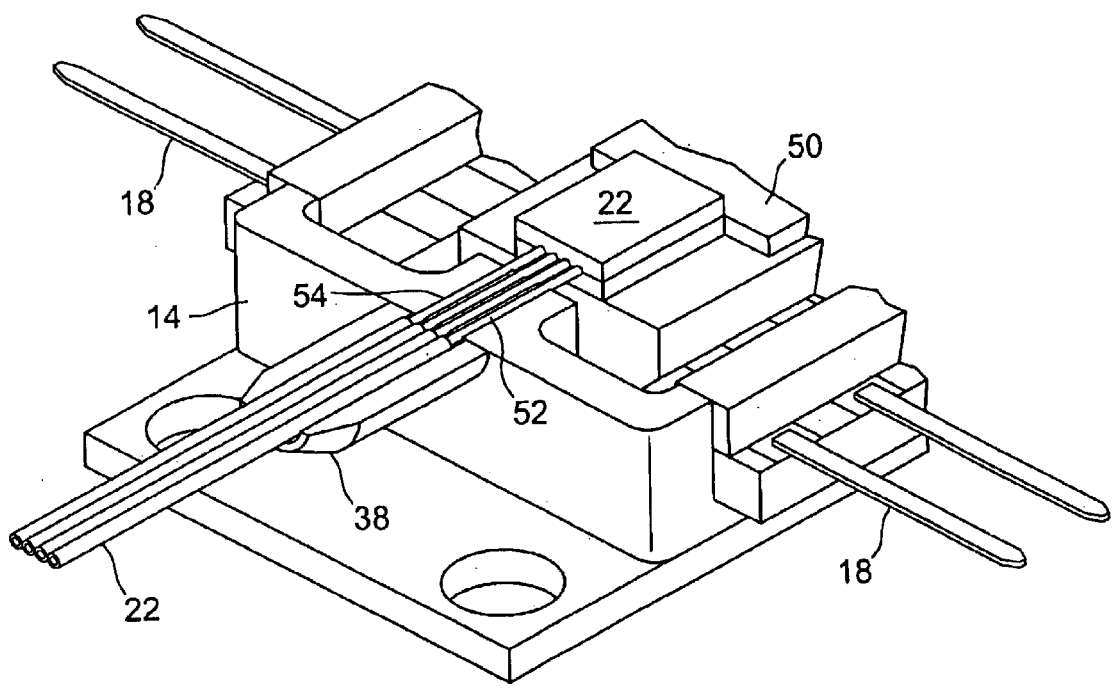
FIG. 6 is a detailed perspective view of a portion of the arrangement of FIG. 5 showing the manner in which the optical fibers are easily laid into the package body of FIG. 2.

FIG. 6 is a detailed showing of a portion of the arrangement of FIG. 5, illustrating the manner in which individual optical fibers 52 of the fiber array 22 are placed within grooves 54 in the fiber feedthrough 38 of the package body 14.

The opposite fiber feedthroughs 36 and 38 of the package body 14 lie within and form a continuous feedthrough path that extends through the hollow interior of the enclosed package 12. The individual optical fibers 52 of the opposite arrays 20 and 22 lie within a common plane extending horizontally along the common feedthrough. In accordance with the invention, the opposite feedthroughs 36 and 38 of the package body 14 and the opposite feedthroughs 46 and 48 of the package lid 16 lie within or substantially within the common plane. The edge portions 42 and 44 of the package body 14 and package lid 16 also lie within the common plane. This allows the optical fiber arrays 20 and 22 to simply be laid in within the feedthroughs 36 and 38 of the package body 14, as shown and described in connection with FIG. 5. When the package lid 16 is placed over the package body 14, and is sealed in place, the enclosed package 12 is formed. This is highly advantageous over those prior art techniques in which the optical fibers must be carefully threaded through end pipes or other apertures at the opposite ends of the package body with a separate submount assembly for mounting the optical integrated circuit 50 and the optical fiber arrays 20 and 22 then being moved into place and secured within a central location in the package body.

The package lid 16 is sealed to the package body 14, such as by solder sealing around the edge portions 42 and 44 using an electrode, after the package lid 16 is placed over the package body 14. With the package lid 16 mounted on the package body 14, the opposite fiber feedthroughs 36, 38, 46 and 48 form opposite end pipes 56 and 58 within which the optical fiber arrays 20 and 22 reside. The individual optical fibers 52 of the arrays 20 and 22 are sealed within the end pipes 56 and 58 by one of several different techniques. The optical fibers 52 can be metallized by providing a thin metal coating thereon, in which event solder sealing of the fibers 52 within the end pipes 56 and 58 can be accomplished by dropping molten solder through vertical holes in the end pipes 56 and 58. Alternatively, solder sealing of bare optical fibers can be performed. Still further, low temperature glass sealing can be used. Epoxy sealing can be used for non-hermetic applications.

The sealing of the optical fiber arrays 20 and 22 within the end pipes 56 and 58 can be done in a separate and subsequent step from the sealing of the package lid 16 on the package body 14. Where both sealing operations are performed by solder sealing, the two operations can be combined into a single step, inasmuch as the solder used for both sealing operations melts at essentially the same temperature. As previously noted, a hermetic seal is considered to have been accomplished when the enclosure formed by the enclosed package and the optical fiber interfaces are sealed, such as by use of the solder sealing described, and without any organic material within the boundaries.

In certain prior art opto-electronic packages, it is necessary to thread the optical fibers through the opposite end pipes. Consequently, the openings within the end pipes must be large enough to accommodate jacketed portions of the optical fibers as well as the thinner bare portions thereof. This leaves a relatively large space between the walls of the apertures within the end pipes and the optical fibers, to be filled with solder during sealing of the optical fibers. As a result, substantial amounts of solder are required, and an effective, hermetic seal is more difficult to achieve. In arrangements according to the present invention, the optical fibers are simply laid in place within the feedthroughs. Because the optical fibers 52 are simply laid in place within the feedthrough portions, the grooves 54 can sized so as to be just large enough to accommodate the optical fibers 52, with the size of the apertures within the end pipes 56 and 58 being just slightly larger than the size of the optical fiber arrays 20 and 22. Consequently, the spaces to be solder sealed are relatively small, and an effective, hermetic seal of the optical fibers is easy to achieve.

Figure 7:
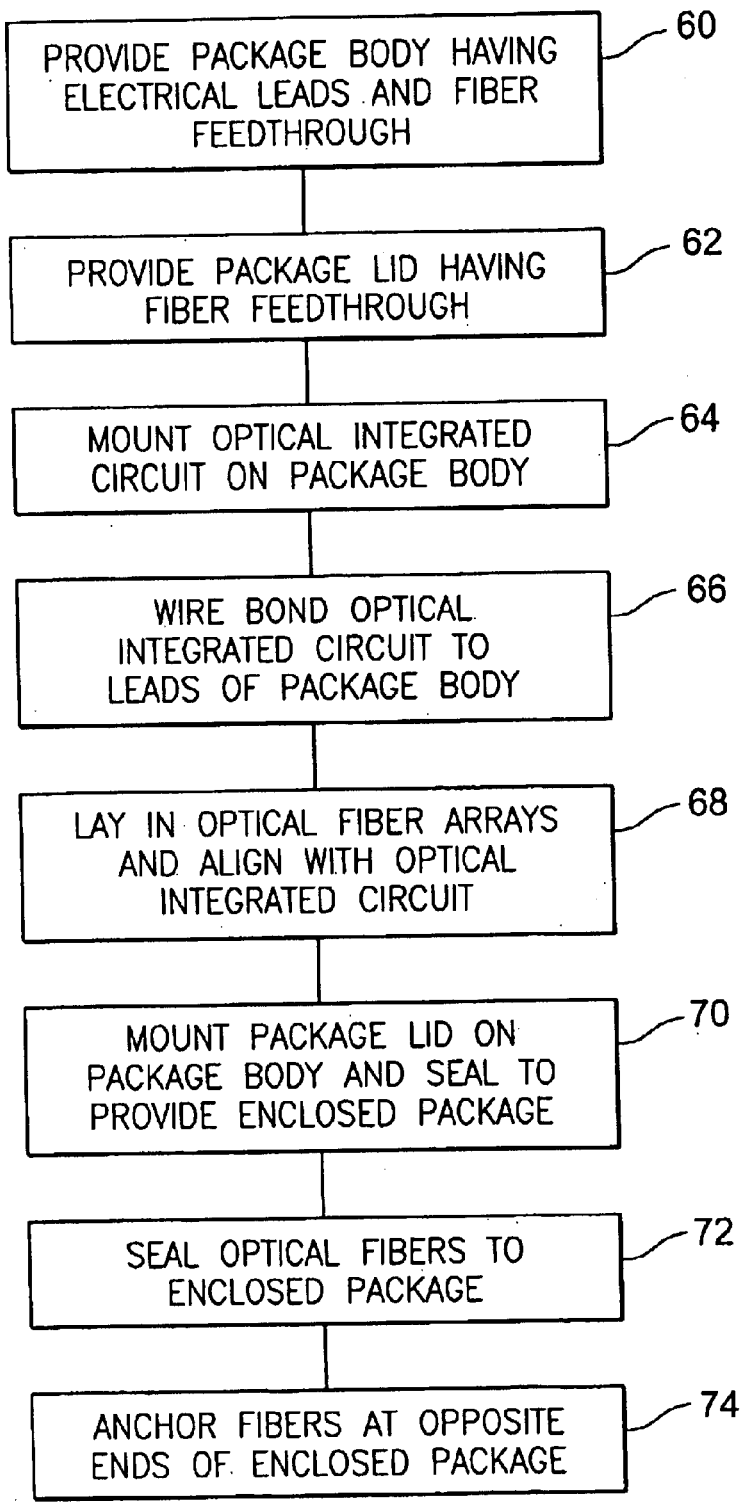
FIG. 7 is a block diagram of the successive steps in a method of making the package of FIG. 1.

FIG. 7 is a block diagram of the successive steps in a method of making the opto-electronic package 10 in accordance with the invention. In a first step 60, the package body 14 is provided. As shown in FIG. 2, the package body 14, as provided, has the electrical leads 18 and the opposite fiber feedthroughs 36 and 38.

In a second step 62, the package lid 16 is provided. As shown in FIG. 3, the package lid 16 is provided with the opposite fiber feedthroughs 46 and 48.

In a third step 64, the optical integrated circuit 50 is mounted on the package body 14. This was shown and previously described in connection with FIG. 4.

In a fourth step 66, the optical integrated circuit 50 is electrically coupled to the package body 14 by wire bonding pads thereon to wire bond pads on the optical integrated circuit 50.

In a fifth step 68, the opposite optical fiber arrays 20 and 22 are laid in place by placement on opposite sides of the optical integrated circuit 50 and within the fiber feedthrough path including the feedthroughs 36 and 38, within the package body 14. Following lay in, the optical fiber arrays 20 and 22 are aligned with the optical integrated circuit 50.

In a sixth step 70, the package lid 16 is placed over the package body 14, and is sealed in place around the interface therebetween formed by the edge portions 42 and 44 of the package body 14 and the package lid 16, such as by solder sealing.

In a seventh step 72, the optical fibers 52 are sealed within the end pipes 56 and 58 formed by the fiber feedthroughs 36, 38, 46 and 48. As previously described, this may be accomplished by dropping molten solder through vertical holes in the end pipes 56 and 58. Also, as previously described, the sealing of the optical fibers 52 within the enclosed package 12 need not be performed as a separate step but can be accomplished at the same time that the package lid 16 is sealed to the package body 14 in the sixth step 70, such as where solder sealing is employed for both sealing operations.

In a final and eighth step 74, the optical fibers 52 are anchored at the opposite ends of the enclosed package 12. Because the optical fibers 52 are relatively brittle and subject to damage, they are anchored at the opposite end pipes 56 and 58. This may be accomplished by applying organic epoxy between the jacketed portions of the fibers and the pipes 56 and 58, and then curing the epoxy.

It will be appreciated by those skilled in the art that opto-electronic packages in accordance with the invention provide various advantages. For one thing, fiber alignment and attachment to the opto-electronic device can be automated without the need for additional substrates, thereby reducing product costs. The package base can be built as a multi-layer ceramic substrate, where desired, to provide the required electrical connectivity. Alternatively, the package may have a metal base. In both cases, a metal seal ring can be used to accomplish optical fiber sealing. The package lid is designed to have the necessary mating features which provide the fiber feedthrough for optical fiber sealing and fiber jacket strain relief. The optical fibers can be fully terminated at both ends prior to the final assembly and the package sealing operations. The design of the opto-electronic package is particularly advantageous for products which require the use of arrays of multiple optical fibers at the opposite sides of the device.

By splitting the enclosed package of the opto-electronic package in or close to the plane of the optical fiber axes, the fibers or fiber arrays can be laid in without having to thread the optical fibers through openings in the package wall. The sealing of the optical fibers may be accomplished by any suitable means. Hermetic sealing requirements are met by using sealing techniques such as solder sealing of metal-coated fibers, solder sealing of bare fibers, and low temperature glass sealing of fibers. Once the necessary assembly operations have been accomplished, the package lid is attached, and this completes the fiber feedthrough. As previously noted, fiber sealing may be done subsequent to or concurrently with the lid sealing operation.

For an opto-electronic package with low electrical pin count requirements, the package body may contain a set of glass-sealed pins, such as in a traditional butterfly-style package. If the product requires controlled impedance for higher electrical signal speeds, a ceramic multi-layer feedthrough may be used instead. For higher electrical pin count requirements, the package base may contain a multi-layer ceramic substrate to provide the required electrical connectivity. For products requiring low thermal impedance, the package base may be constructed of a material with high thermal conductivity, such as aluminum nitride or copper-tungsten.

It will be understood by those skill in the art that the invention is not limited to the embodiments shown and described herein. Such embodiments have been provided only as examples.

What is claimed is:

1. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure;

wherein the optical fiber comprises plural optical fibers extending through at least one side of the package into the enclosed package along the common plane;

wherein the opposite portions of the package comprise a package body and a package lid joined at said interface and configured to form end pipes around the optical fibers at at least one side of the package; and wherein the package body and the package lid are configured to form end pipes at adjacent sides of the package.

2. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure; and further including a second optical fiber extending through a second peripheral portion of the package along the common plane.

3. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure;

wherein the optical fiber comprises plural optical fibers extending through at least one side of the package into the enclosed package along the common plane; and wherein the plural optical fibers extend through opposite sides of the package into the enclosed package along the common plane.

4. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure;

wherein the optical fiber comprises plural optical fibers extending through at least one side of the package into the enclosed package along the common plane; and wherein the plural optical fibers extend through adjacent sides of the package into the enclosed package along the common plane.

5. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure;

wherein the optical fiber comprises plural optical fibers extending through at least one side of the package into the enclosed package along the common plane; and wherein the plural optical fibers comprise opposite arrays of optical fibers lying within the common plane.

6. An opto-electronic package comprising the combination of:

an enclosed package;

a plurality of electrical contacts extending into the enclosed package;

an optical device mounted within the package and coupled to the electrical contacts; and an optical fiber extending through at least one peripheral portion of the package to the optical device along a common plane;

wherein the package is comprised of opposite portions joined together at an interface substantially at the common plane and forming a hermetic enclosure;

wherein the optical fiber comprises plural optical fibers extending through at least one side of the package into the enclosed package along the common plane; and wherein the opposite portions of the package comprise a package body and a package lid joined at said interface and configured to form end pipes around the optical fibers at at least one side of the package; and wherein the package body and the package lid are configured to form end pipes around optical fibers at opposite sides of the package.

7. An opto-electronic package comprising the combination of:

a package body having electrical leads extending through at least one side thereof to wire bond pads within the body, and a fiber feedthrough path extending through the package body from at least one side thereof;

an optical device mounted in the package body and coupled to the wire bond pads;

at least one fiber array extending into the package body from at least one side thereof along the fiber feedthrough path; and a package lid mounted on and enclosing the package body and having at least one feedthrough portion disposed at the fiber feedthrough path;

wherein the package has a plurality of fiber arrays.

8. An opto-electronic package according to claim 7, wherein the plurality of fiber arrays extend into the package body from different sides thereof.

* * * * *